United States Patent [19]

Kizaki et al.

[11] Patent Number: 4,466,110
[45] Date of Patent: Aug. 14, 1984

[54] ARTIFICIAL SYNC SIGNAL ADDING CIRCUIT

[75] Inventors: Yoshio Kizaki; Mitsugu Ikawa, both of Tokyo, Japan

[73] Assignee: Clarion Co., Ltd., Tokyo, Japan

[21] Appl. No.: 327,890

[22] Filed: Dec. 7, 1981

[30] Foreign Application Priority Data

Dec. 10, 1980 [JP] Japan .................................. 55-174890

[51] Int. Cl.³ .............................................. H04L 7/00
[52] U.S. Cl. ...................................... 375/108; 328/73; 328/120; 375/120
[58] Field of Search ............... 307/269, 511, 516, 518, 307/527, 528; 331/1 A; 328/72, 73, 109, 120; 358/155; 360/38, 51; 375/108, 110, 120

[56] References Cited

U.S. PATENT DOCUMENTS

| | | | |
|---|---|---|---|
| 3,302,114 | 1/1967 | Den Hertog | 375/108 |
| 3,424,982 | 1/1969 | Kawashima et al. | 375/4 |
| 4,004,162 | 1/1977 | Kato et al. | 328/120 |
| 4,363,002 | 12/1982 | Fuller | 331/1 A |

*Primary Examiner*—Benedict V. Safourek
*Attorney, Agent, or Firm*—Wallenstein, Wagner, Hattis, Strampel & Aubel

[57] ABSTRACT

An artificial synchronizing signal adding circuit which comprises a discriminating circuit for discriminating a continuous synchronizing signal having a constant period among an information signal including the synchronizing signal and an artificial sync signal adding circuit for adding an artificial sync signal to a part of the information signal where the synchronizing signal is lacking in response to the discrimination of the discriminating circuit when the synchronizing signal is lacking.

3 Claims, 7 Drawing Figures

ARTIFICIAL SYNC SIGNAL ADDING CIRCUIT

BACKGROUND OF THE INVENTION

1. Field of the Invention

This invention relates to an artificial sync signal adding circuit, and more particularly to improvements in a circuit in an apparatus for treating an information signal as an imput signal by synchronizing it with a synchronizing signal having a continuous constant period which is involved in the imformation signal, which circuit is capable of carrying out smooth synchronizing operation by generating artificial synchronizing signal and adding it to the input signal when the synchronizing signal is lacking in the input signal.

2. Description of the Prior Art

To treat an information, it is generally required to synchronize the information with an apparatus for treating the information. In this connection, synchronizing signal is adopted. Particularly, in order to synchronize an information signal including a continuous synchronizing signal having a constant period with the treating apparatus, a circuit as shown in FIG. 1 has been proposed.

In FIG. 1, the block A is a PLL circuit while the block B is a sync signal discriminating circuit for discriminating a continuous synchronizing signal having a constant period among the input information signal.

In FIG. 1, the reference numeral 1 designates a phase comparator, 2 a low pass filter, 3 a voltage control oscillator, 4 a frequency divider, 5 a NAND gate, 6 a flip-flop circuit, 7 an AND gate and 8 a counter, respectively.

The phase comparator 1 of the block A compares an output signal of the block B with an output signal of the frequency divider 4 and thereafter puts out the phase difference between those outputs to the low pass filter 2. The input signal is taken off unnecessary components such as frequency component, etc. by the low pass filter 2 and is consequently put out as being control voltage of the voltage control oscillator 3. The output signal from the voltage control oscillator 3 is applied to one of input terminals of the AND gate 7 of the block B as well as to the frequency divider 4 of the block A. The frequency divider 4 divides the oscillating frequency of the input signal by an integer to apply one of the divisions to one of input terminals of the phase comparator 1. If the phase difference between said two input signals is going to increase, the output signal from the low pass filter 2 controls the oscillating frequency of the voltage control oscillator 3 so as to reduce the phase difference. Therefore, the output terminal O of the voltage control oscillator 3 puts out a signal which synchronizes with the phase of a reference input signal applied to the input terminal of the phase comparator 1 of the block A from the block B and has a frequency as being an integral multiple of the frequency of the reference input signal.

In the block B, when the flip-flop circuit 6 is in the condition with the output Q being at a low level and with the output $\bar{Q}$ being at a high level and the high level signal is applied to the input terminal T, the input terminal $\bar{S}$ of the flip-flop circuit 6 is triggered through the NAND gate 5 so that the outputs Q and $\bar{Q}$ put out outputs of a high level and a low level, respectively. Consequently, the counter 8 begins counting of the output signals from the voltage control oscillator 3 of the block A and the output of the NAND gate 5 becomes high irrespective of the input signal T. When the counter 8 counts up a predetermined value, the output terminal W thereof puts out a signal by which the clear terminal U of the counter 8 as well as the input terminal $\bar{R}$ of the flip-flop circuit 6 recovers in the original condition and the condition of the NAND gate 5 for cutting off the input signal is released. Therefore, by setting the full-counting value of the counter 8 shorter than the period of the synchronizing signal included in the input signal, it can be understood that the output signal of the block B has been obtained as a result of the discrimination of the synchronizing signal.

As described above in FIG. 1, the block A operates as a PLL circuit while the block B descriminates only the continuous synchronizing signal having a constant period among the information signal and applies the synchronizing signal to the block A as a reference signal. Then, at the output terminal O of the block A there can be obtained a signal which synchronizes with the phase of the synchronizing signal and has a frequency of an integral multiple of the synchronizing signal. The interrelation of respective operations of the above-described circuit is shown in FIG. 2.

Thus, the circuit for synchronizing with the information signal including the continuous synchronizing signal having a constant period has certainly been developed. However, in such a circuit, when occurs that a synchronizing signal is missing from the information signal in the course of transmission, alternatively when noises occur after the signal, the input terminal $\bar{S}$ of the flip-flop circuit 6 of the block B in FIG. 1 is not triggered while it is thereafter triggered by the information signal in the input signal or noises. Therefore, the signal which then appears at the output Q of the flip-flop circuit 6 is not a one obtained as a result of the discrimination. In this case, there are such drawbacks that a lot of time is required since the above condition until the syncronizing signal is again discriminated and that operations of treating an information, etc, is not performed during that time.

OBJECT OF THE INVENTION

Therefore, the present invention has its object in solving the above-mentioned conventional drawbacks, and is characterized in that there is provided an artificial synchronizing signal adding circuit C as shown in FIG. 3 for generating an artificial synchronizing signal S when a synchronizing signal within the input signal I is lacking and add it to the input signal I to thereby allow the operation to continue as if the synchronizing signal were discriminated as well as to swiftly discriminated the normal synchronizing signal when it is put in, whereby the operations for processing information can be performed even when a synchronizing signal is lacking.

SUMMARY OF THE INVENTION

In accordance with the present invention, there is provided an artificial synchronizing signal adding circuit which comprises:

a receiving means for receiving an information signal including a continuous synchronizing signal having a constant period;

a sync signal discriminating means for discriminating said synchronizing signal among said information signal;

an artifucial sync signal generating means for generating an artificial sync signal while said receiving means does not receive said synchronizing signal; and an artificial sync signal adding means for adding said artificial sync signal to a part of said information signal where said synchronizing signal is lacking.

DETAILED DESCRIPTION OF THE PREFERRED EMBODIMENTS

Figure 1:
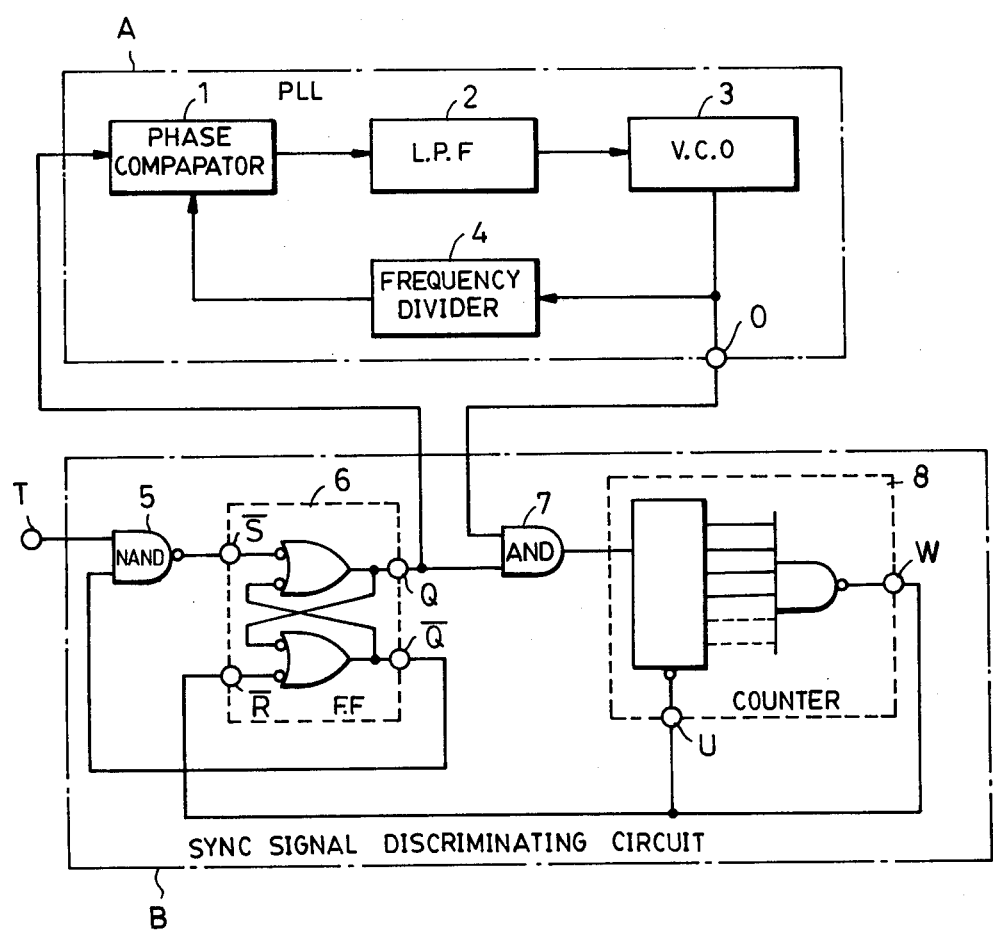
FIG. 1 shows a block diagram illustrating a PLL circuit having a conventional synchronizing signal discriminating function.
Figure 2:
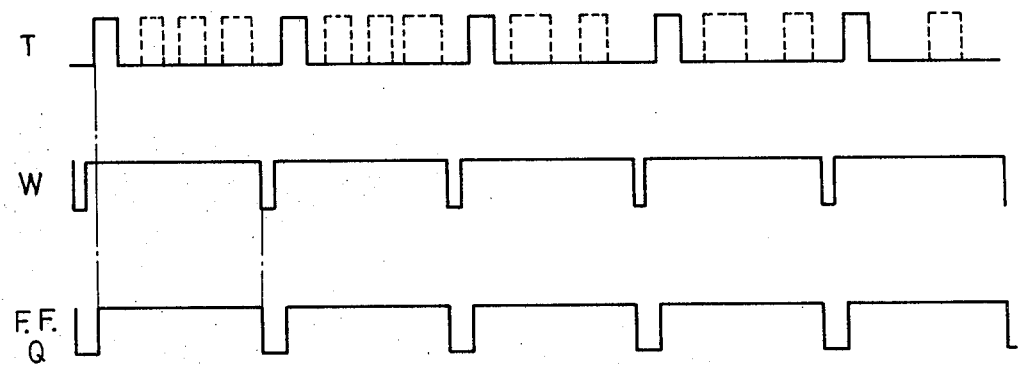
FIG. 2 shows a timing chart for explaining the function of FIG. 1.
Figure 3:
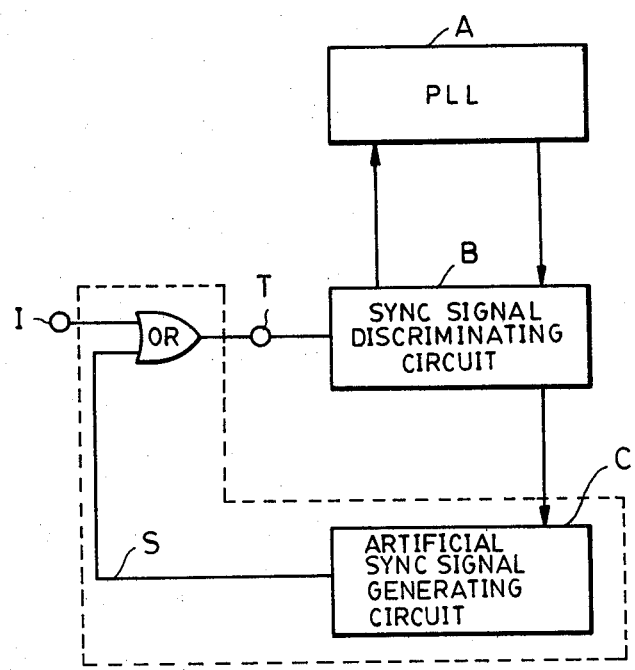
FIG. 3 shows a block diagram illustrating fundamental structure of the subject matter of the present invention.

The present invention will now be described in detail referring to the preferred embodiment illustrated in the drawings.

Figure 4:
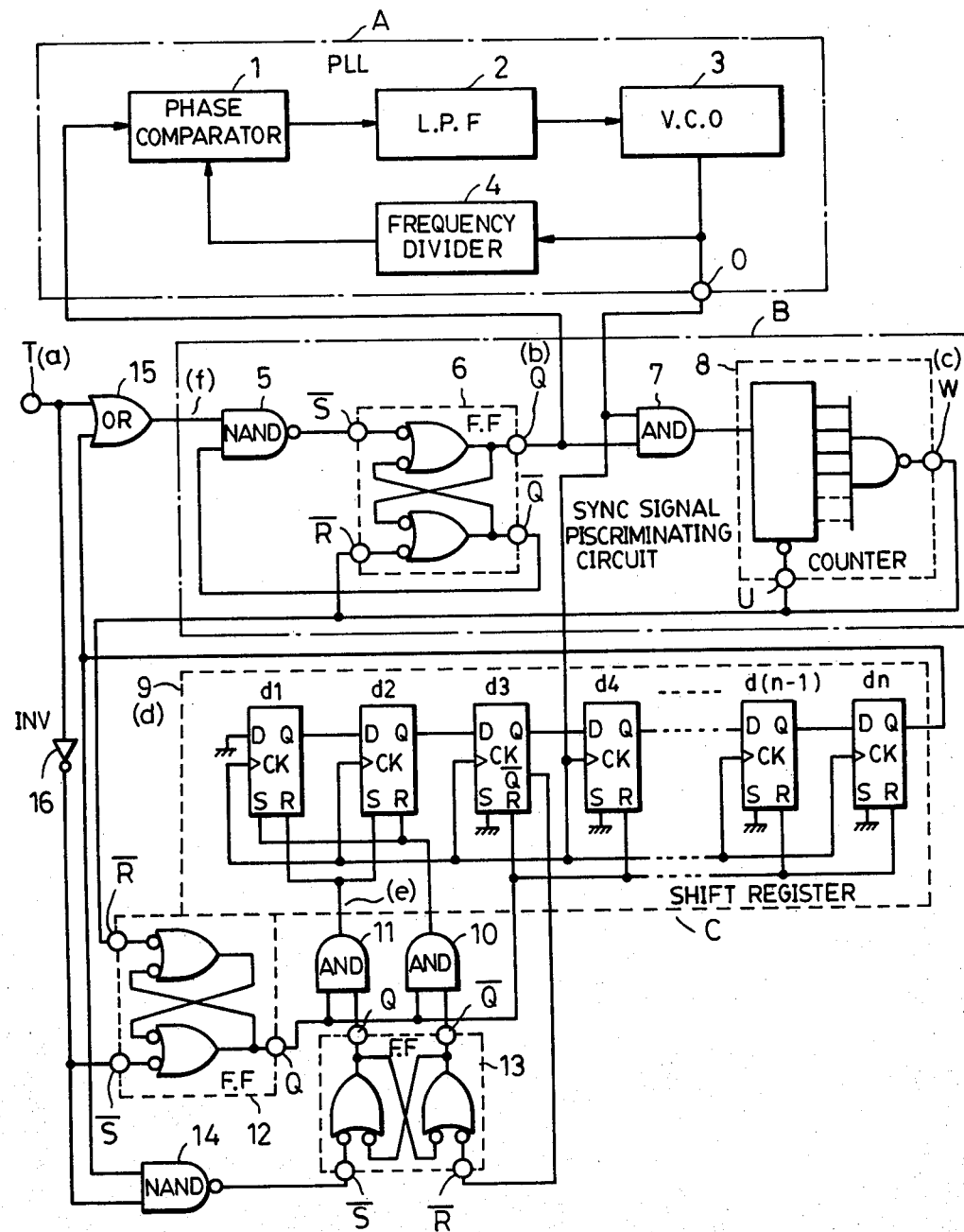
FIG. 4 shows a block diagram illustrating an embodiment according to the present invention.

In FIG. 4 the same reference numerals as those in FIG. 1 designate the same or similar circuits. The reference numeral 9 denotes a shift register comprising n stages of D flip-flop circuits $d_1-d_n$ (n is an integer) each having a set terminal S and a reset terminal R. The numerals 10 and 11 are AND gates, 12 and 13 are flip-flop circuits, 14 is a NAND gate, 15 is an OR gate and 16 is an inverting gate.

The shift register 9 is supplied with the output signal O from the block A as a block input and the D flip-flop circuits $d_3-d_n$ are reset when the output Q of the flip-flop circuit 12 puts out a high level signal, respectively. One of the flip-flop circuits $d_1$ and $d_2$ is set through one of the AND gates 10 and 11 in accordance with the result which of the outputs Q and $\bar{Q}$ puts out a higher level signal while the other of the flip-flop circuits $d_1$ and $d_2$ is reset. The output terminal of the shift register 9 is connected to respective one of the input terminals of the NAND gate 14 and the OR gate 15 and the output terminal of the OR gate 15 is connected to the input of the NAND gate 5.

The information signal I including the continuous synchronizing signal having a constant period is applied to the other input terminal of the OR gate 15 and to the input terminal of the inverting gate 16. The output of the inverting gate 16 is connected to the set terminal $\bar{S}$ of the flip-flop circuit 12 as well as to the other input terminal of the NAND gate 14. The reset terminal $\bar{R}$ of the flip-flop circuit 12 is triggered by the output signal from the counter 8 of the block B. The reset terminal $\bar{R}$ of the flip-flop circuit 13 is triggered by the output $\bar{Q}$ of the D flip-flop circuit $d_3$ of the shift register 9 while the set terminal $\bar{S}$ is triggered by the output of the NAND gate 14.

Figure 5:
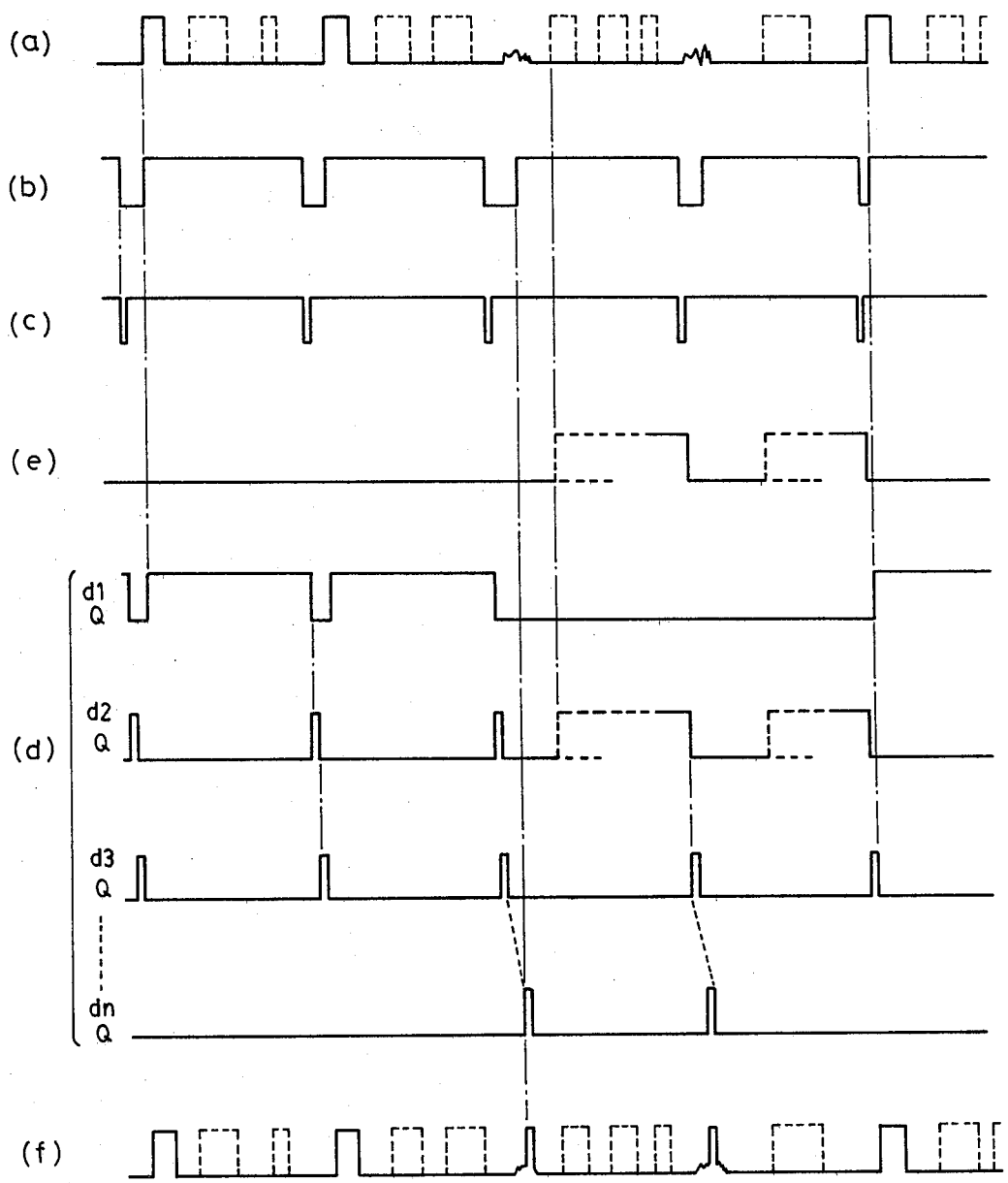
FIG. 5 shows a timing chart for explaining the function of the embodiment of FIG. 4.

The functional timing of the circuit in this embodiment is shown in FIG. 5 wherein the symbols (a) (b) (c) . . . show respective signal wave forms in the portions indicated by the same symbols in FIG. 4.

Now, let it be granted that in FIG. 4, the block B has discriminated the synchronizing signal from the input signal and is putting out the output as shown in FIG. 5 (b). The counter 8 of the block B generates an output signal when counting up the predetermined full count as shown in FIG. 5 (c) and the signal triggers the reset terminal $\bar{R}$ of the flip-flop circuit 6, the clear terminal U of the counter 8 and the reset terminal $\bar{R}$ of the flip-flop circuit 12. Accordingly, the counter 8 is cleared while the flip-flop circuit 6 returns in its original condition and thereafter keeps the condition until the synchronizing signal is applied as shown in FIG. 5 (b). Further, since the output Q of the flip-flop circuit 12 puts out a low level signal, each of the D flip-flop circuits $d_1-d_n$ of the shift register 9 is released from its set or reset condition to shift said condition to the next right D flip-flop circuit, whereby the reset terminal $\bar{R}$ of the flip-flop circuit 13 is first triggered so that the output Q thereof puts out a low level signal.

Next, when the synchronizing signal is applied to the terminal T at the normal timing, the blocks A and B continue their normal operations as described above. Further, the set terminal $\bar{S}$ of the flip-flop circuit 12 is triggered with its output Q outputting a high level signal whereby the D flip-flop circuits $d_2-d_n$ of the shift register 9 are reset while the D flip-flop circuit $d_1$ is set. The output relation of the D flip-flop circuits $d_1-d_n$ is shown in FIG. 5 (d).

When the terminal T is not provided with the synchronizing signal at the proper time, the set terminal $\bar{S}$ of the flip-flop circuit 12 is not triggered so that the output Q thereof continues outputting a low level signal, whereby the shift register 9 is not reset to continue the shifting operation. Therefore, by establishing the number n of the D flip-flop circuits so that the sum of the predetermined value of the counter 8 and the number n of the D flip-flop circuits of the shift register 9 is larger by 1 than the divisor of the frequency divider 4, a high level signal is put out at the output Q of the shift register 9 one clock later than the timing for the synchronizing signal being applied. The high level signal at the output Q of the shift register 9 triggers the set terminal $\bar{S}$ of the flip-flop circuit 13 allow the output Q of the flip-flop circuit 13 to put out a high level signal. Further, the high level signal at the output Q of the shift register 9 is added to the input signal through the OR gate 15 to thereby trigger the set terminal $\bar{S}$ of the flip-flop circuit 6 through the NAND gate 5 so that the block B discriminates the signal as being the synchronizing signal, allowing the counter 8 to start counting one clock later than the normal timing. When the terminal T is thereafter supplied with the information signal as the input signal, the set terminal $\bar{S}$ of the flip-flop circuit 12 is triggered and the shift register 9 is reset. In this case, since the output Q of the flip-flop circuit 13 is outputting the high level signal as described above, only the D flip-flop circuit $d_2$ is set while the other D flip-flop circuits are reset respectively. As mentioned above, when the synchronizing signal is missing, the counter 8 starts to count one clock later than the normal timing and accordingly counts up the predetermined full count and generates the output signal one clock later, also. However, since the D flip-flop circuit $d_2$ is kept set in the shift register 9, the correction is made so that the output of the shift register 9 puts out a high level signal at the timing one clock later even when the synchronizing signal is again missing. Under that condition, if a normal synchronizing signal appears, the block B discriminates the normal synchronizing signal and applies it to the block A allowing the counter 8 to start counting at the normal timing. In this case, since the set terminal $\bar{S}$ of the flip-flop circuit 13 is not triggered to thereby put out a high level signal from the output Q thereof, when the set terminal $\bar{S}$ of the flip-flop circuit 12 is triggered to reset the shift register 9, the D flip-flop circuit $d_1$ is set while the other D flip-flop circuits are reset. Thus, it will be understood that the circuit swiftly synchronizes with the synchronizing signal.

Figure 6:
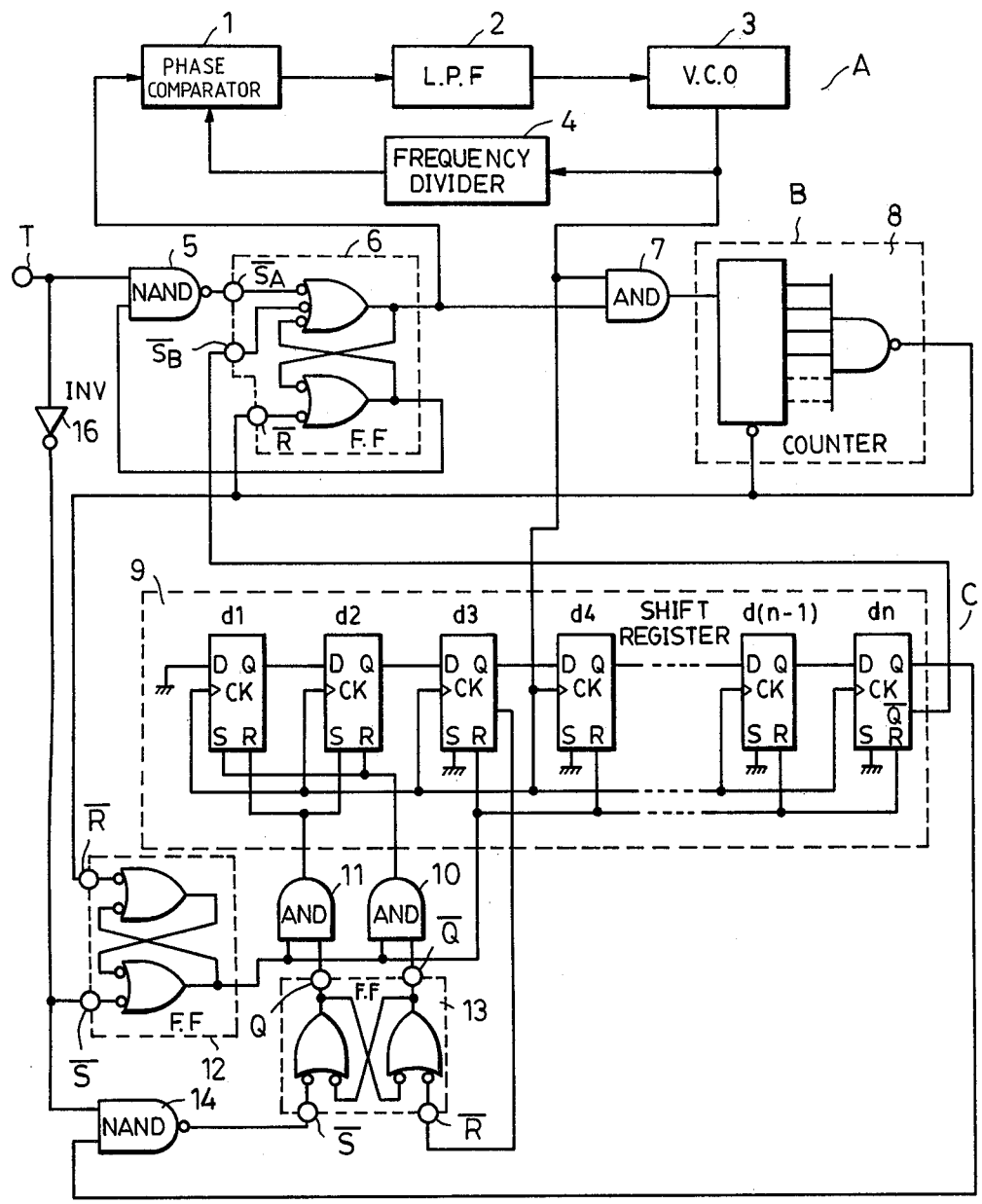
FIGS. 6 and 7 each shows a block diagram illustrating another embodiment according to the present invention.

Another embodiment according to the present invention is shown in FIG. 6 in which an inverting output $\bar{Q}$ of the D flip-flop circuit $d_n$ is connected to a further set terminal $S_B$ of the flip-flop circuit 6.

Figure 7:
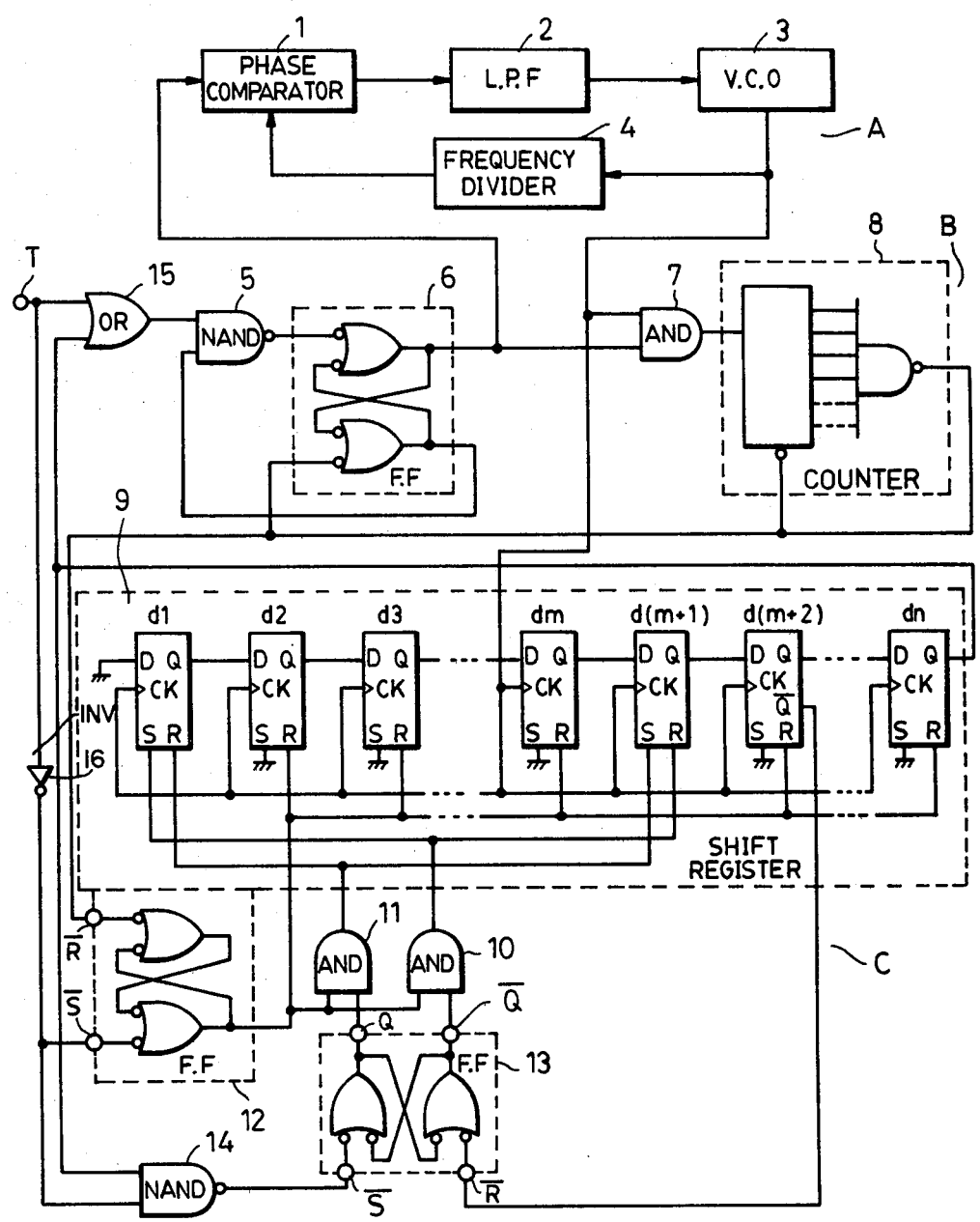

It should be noted that in accordance with the present invention, an artificial sync signal can be put out at a desired later tune with respect to the synchronizing signal by increasing the number n of the D flip-flop circuits of the shift register 9. A further embodiment arranged as above is shown in FIG. 7 in which the clock number which is desired to be late is designated by m (m is an integer).

Incidentally, in the embodiments as shown in FIG. 4 and others, by replacing the shift register 9 with a counter, the same function can be obtained.

As described above, according to the present invention, even when the synchronizing signal is missing in the input signal, an artificial synchronizing signal is added. Therefore, the function continues as if the normal synchronizing condition is maintained and the normal synchronizing function swiftly recovers when the normal synchronizing signal is again put in. Further, variation of the oscillating frequency of the voltage control oscillator while the synchronizing signal is missing is made more moderate, thus allowing information processing even while the synchronizing signal is missing.

We claim:

1. A synchronizing signal reconstituting circuit which comprises:

a receiving means for receiving an input signal including an information signal and a synchronizing signal having a constant period;

a synchronizing signal discriminating means for discriminating said synchronizing signal in said input signal from said receiving means;

an artificial synchronizing signal generating means for generating an artificial synchronizing signal when a synchronizing signal is missing from said input signal received in said receiving means; and an artificial synchronizing signal adding means for adding said artificial synchronizing signal to said input signal, said artificial synchronizing signal generating means including a first flip-flop circuit and a shift register, said first flip-flop circuit being actuated to a set condition by said synchronizing signal or said information signal from said receiving means and being actuated to a reset condition in response to the discrimination of said discriminating means, the shifting function of said shift register being controlled in response to outputs from said first flip-flop circuit, and the output signals from said shift register supplying said artificial synchronization signal.

2. The circuit as claimed in claim 1 wherein said artificial synchronizing signal generating circuit further comprises a NAND gate to which said synchronizing signal as well as said artificial synchronizing signal are applied and a second flip-flop circuit which is set by the output from said NAND gate, so that said shift register is controlled by the output of said second flip-flop circuit to correct the delay of the timing of said artificial synchronizing signal when said synchronizing signal is continuously missing.

3. The circuit as claimed in claim 1 further comprising a phase locked loop circuit coupled to be supplied with a synchronizing signal discriminated by said discriminating means as a reference signal so that the output of said phase locked loop circuit is applied to said shift register as a clock signal.

* * * * *